(12) United States Patent
Mullen (10) Patent No.: US 10,749,322 B2
(45) Date of Patent: Aug. 18, 2020

(54) SHROUDED IN-USE COVER FOR A JUNCTION BOX

(71) Applicant: Nate Mullen, Valley Center, CA (US)

(72) Inventor: Nate Mullen, Valley Center, CA (US)

(*) Notice: Subject to any disclaimer, the term of this patent is extended or adjusted under 35 U.S.C. 154(b) by 85 days.

(21) Appl. No.: 16/223,585

(22) Filed: Dec. 18, 2018

(65) Prior Publication Data

US 2019/0190243 A1 Jun. 20, 2019

Related U.S. Application Data

(60) Provisional application No. 62/607,240, filed on Dec. 18, 2017.

(51) Int. Cl.
*H02G 3/08* (2006.01)
*H02G 3/14* (2006.01)

(52) U.S. Cl.
CPC .............. *H02G 3/14* (2013.01); *H02G 3/088* (2013.01); *H02G 3/085* (2013.01)

(58) Field of Classification Search
CPC .......... H02G 3/08; H02G 3/081; H02G 3/088; H02G 3/10; H02G 3/14; H05K 5/02; H05K 5/03; H05K 5/00; H05K 5/0204; H05K 5/0217; H05K 5/0247; H01H 9/02; H01H 9/04
USPC .. 174/480, 481, 50, 53, 57, 58, 66, 67, 559; 220/3.2–3.8, 4.02, 241, 242; 248/906
See application file for complete search history.

(56) References Cited

U.S. PATENT DOCUMENTS

| | | | | |
|---|---|---|---|---|
| 3,622,029 A * | 11/1971 | Ware | ..................... | H02G 3/086 174/57 |
| 4,803,307 A * | 2/1989 | Shotey | .................. | H02G 3/088 174/67 |
| 5,317,108 A * | 5/1994 | Prairie, Jr. | ............... | H02G 3/14 174/67 |
| 7,265,292 B2 * | 9/2007 | Greenfield | ............ | H02G 3/088 174/50 |
| 7,626,121 B1 * | 12/2009 | Cleghorn | ................ | H02G 3/14 174/53 |
| 7,915,528 B2 * | 3/2011 | Ni | ...................... | H01R 13/5213 174/50 |
| 8,013,245 B2 * | 9/2011 | Korcz | ................... | H02G 3/081 174/53 |
| 8,106,295 B1 * | 1/2012 | Shotey | .................... | H02G 3/14 174/66 |
| 8,110,743 B2 * | 2/2012 | Drane | ..................... | H02G 3/14 174/53 |

(Continued)

*Primary Examiner* — Angel R Estrada
(74) *Attorney, Agent, or Firm* — Kelly & Kelley, LLP (57) ABSTRACT

An in-use cover for an electrical junction box, where the cover cap is selectively attachable to and removable from the base plate through sliding engagement of channels on the perimeter of the base plate and ledges on the perimeter of the cover cap. The cover cap defines a hollow interior that overlays one or more component ports in the base plate when attached to the base plate. The cover cap has a bottom cut-out configured to accommodate plugs or other electrical components connected to the electrical junction box. The base plate has a bottom ledge configured to engage the bottom cut-out. When the cover cap is fully engaged in the base plate, the hollow interior and any electrical components contained therein are effectively sealed from intrusion of most moisture.

19 Claims, 13 Drawing Sheets

(56) References Cited

U.S. PATENT DOCUMENTS 8,251,253 B1 * 8/2012 Cleghorn ................ H02G 3/14
174/50

* cited by examiner

FIG. 13

SHROUDED IN-USE COVER FOR A JUNCTION BOX

RELATED APPLICATION

This application claims the benefit of U.S. Provisional Patent Application No. 62/607,240, filed on Dec. 18, 2017.

BACKGROUND OF THE INVENTION

The present invention is directed to an improved in-use cover for an electrical junction box. More particularly, the improved in-use cover provides a safer and easier to use protective cover for outdoor electrical boxes.

Prior art in-use covers for electrical boxes have several drawbacks. Such prior art covers are typically permanently attached to the electrical boxes as at a pivot or hinge. The covers are used to protect electrical components such as switches, outlets, sockets and similar electrical devices. In order to reliably protect such electrical devices against the intrusion of water, moisture, and other environmental hazards, the covers attached by pivots or hinges usually have a spring or similar mechanism biasing the cover closed.

Such prior art covers can be difficult to work with, repair, and/or replace. In a case where the prior art cover has a low profile, the cover typically is not permitted to return to cover the underlying electrical component, such as when a plug is inserted into an outlet. Plugs and cords typically extend outward from an outlet such that the low-profile cover is not permitted to close completely. Even with some plugs that have a low profile or where the cord extends to the side, the low-profile cover still cannot close completely and the cord may still interfere with the placement of the hinge or spring biasing.

In the case where the prior art cover has a larger profile, the hinged or pivoting cover is typically boxier and bulkier such that it might interfere with surrounding structures, e.g., walls, lights, corners, etc., and not open all the way. The larger profile cover may also not close completely because of interference with plugs, cords, or other equipment, e.g., timers, transformers, etc., that are connected to the electrical components.

Accordingly, there is a need for an in-use cover that provides sufficient room for connecting plugs, cords, timers, transformers, and other electrical devices to junction boxes, while still providing sufficient covering against weather and other environmental hazards. The present invention fulfills these needs and provides other related advantages.

SUMMARY OF THE INVENTION

The present invention is directed to an in-use cover for an electrical junction box. The in-use cover includes a base plate and a cover cap. The base plate is configured for attachment to an electrical junction box and has a back wall with a component port. Alternatively, the base plate may have at least two or more component ports in the back wall. The back wall is recessed relative to surrounding perimeter walls on the base plate. The in-use cover may further have a gasket configured for disposal behind the base plate when it is attached to an electrical junction box.

The cover cap is configured for selective attachment to the base plate by removable engagement with the perimeter walls of the base plate. The cover cap has a hollow interior disposed in proximity to the component port when the cover cap is attached to the base plate.

The perimeter walls of the base plate include a top wall, a bottom wall, and two side walls. Each side wall has a side edge distal from the back wall. The side edge on each side wall has a receiving channel. The cover cap has a pair of side ledges configured for sliding engagement with the receiving channel on each side edge. The top wall has a raised edge and the cover cap has a top ledge configured for engaging the raised edge when the cover cap is fully engaged with the perimeter walls.

The bottom wall of the base plate has a lower ledge that extends distal from the back wall. The cover cap has a bottom cut-out configured for matching engagement with the lower ledge when the cover cap is fully engaged with the perimeter walls of the base plate. The lower ledge has a wire knock-out corresponding to the component port. The bottom cut-out of the cover cap has an interior ledge surrounding the bottom cut-out, the interior ledge configured to rest against a perimeter of the lower ledge.

BRIEF DESCRIPTION OF THE DRAWINGS

The accompanying drawings illustrate the invention. In such drawings.

DETAILED DESCRIPTION OF THE PREFERRED EMBODIMENTS

The present invention is directed to an in-use cover for use with a junction box and similar electrical connections. In the following detailed description, the in-use cover will be generally referred to by reference numeral 20. FIGS. 1-6 generally show the in-use cover 20 from multiple angles. The in-use cover 20 is intended for use in outdoor settings so as to protect against the intrusion of environmental hazards like water or moisture, as by rain, splashing, or hoses.

Figure 1A:
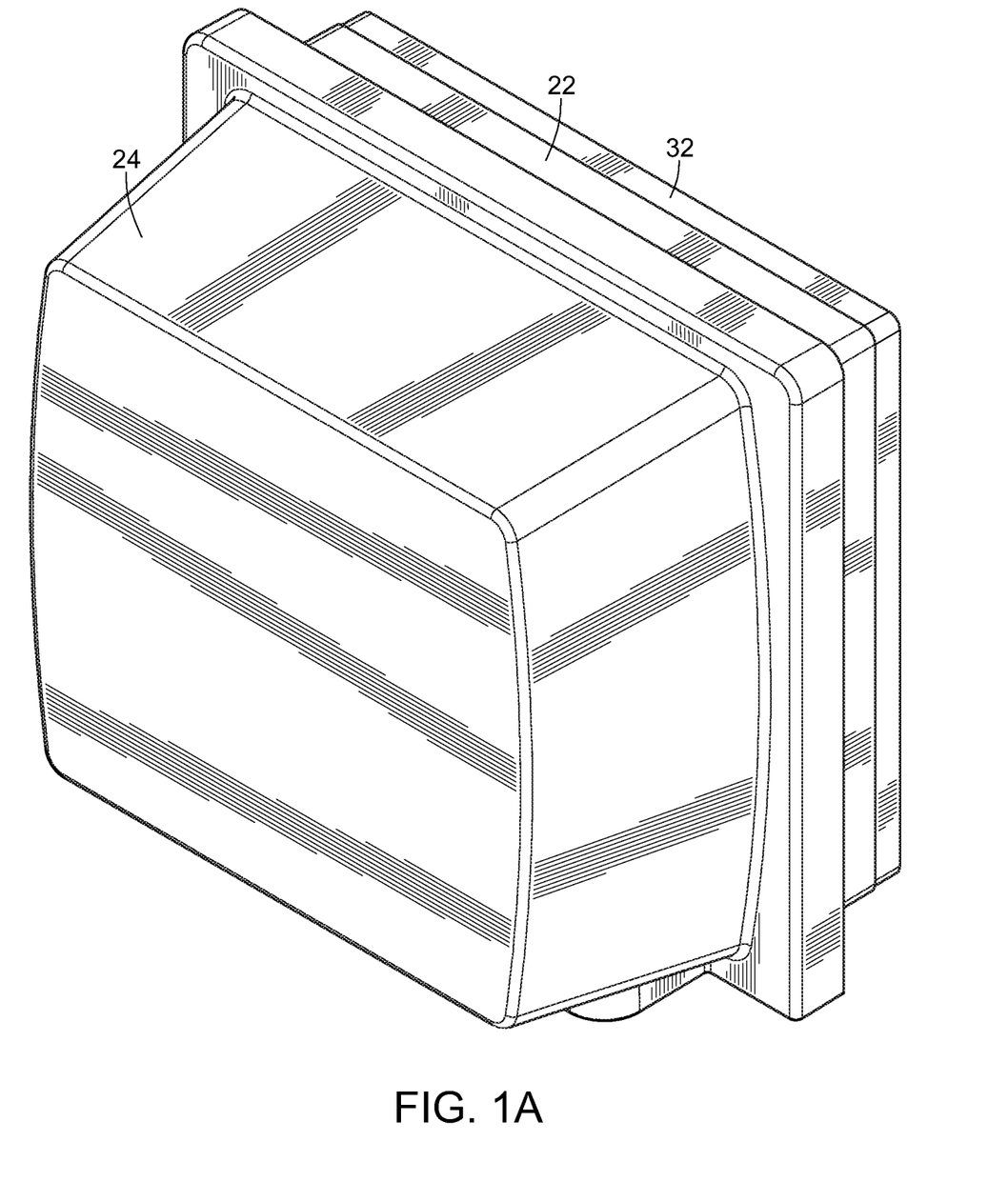
FIG. 1A is a front perspective view of an inventive in-use cover according to the present invention.
Figure 1B:
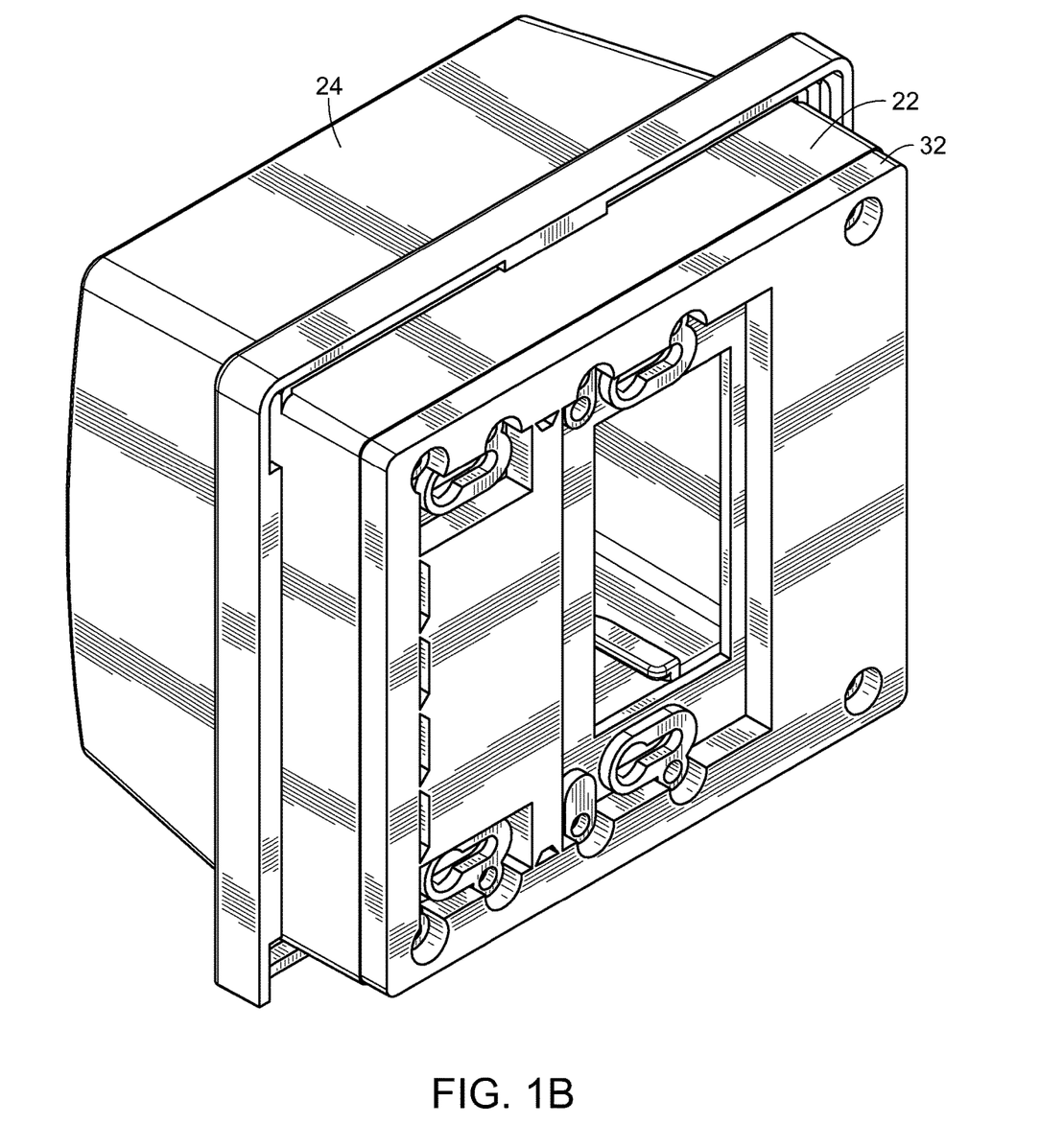
FIG. 1B is a rear perspective view of an inventive in-use cover according to the present invention.

The in-use cover 20 includes a base plate 22 and a cover cap 24 designed to engage with and enclose a front surface 22a of the based plate 22. The base plate 22 has the front surface 22a, a rear surface 22b, and at least a first component port 26. The base plate 22 also preferably has a second component port 28 that is initially closed by a knockout cover 28a that is selectively removable. The base plate 22 also has a plurality of securing holes 22c for attaching the base plate 22 to a junction box (not shown) as by screws or similar fastening means.

Figure 2:
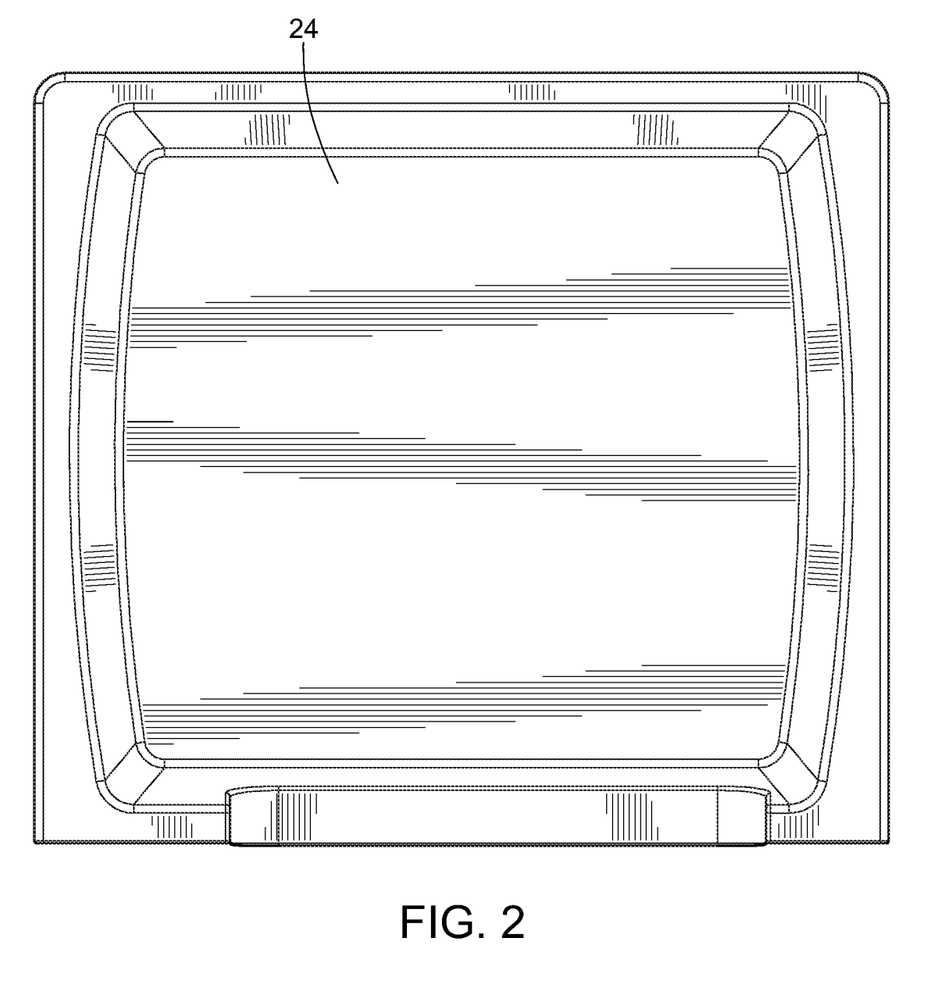
FIG. 2 is front view of an inventive in-use cover according to the present invention.
Figure 3:
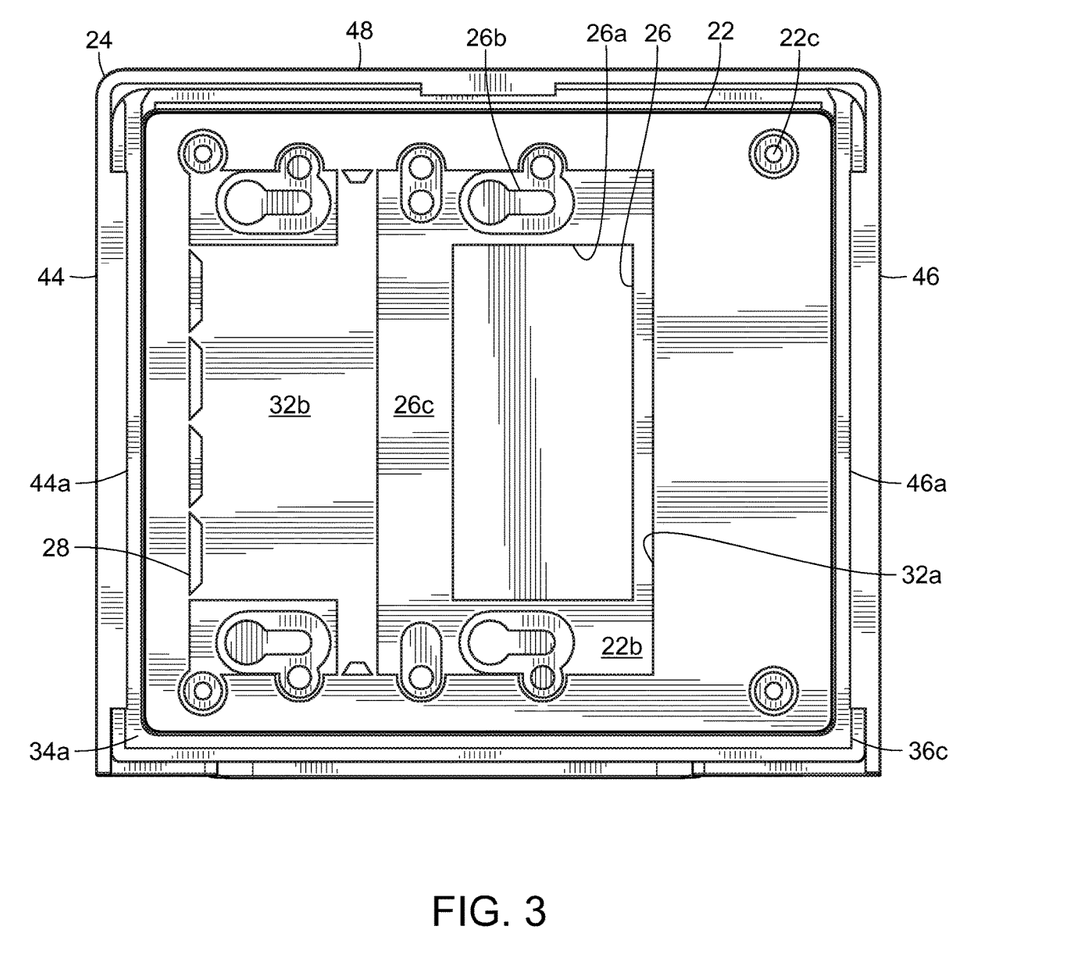
FIG. 3 is a rear view of an inventive in-use cover according to the present invention.
Figure 4:
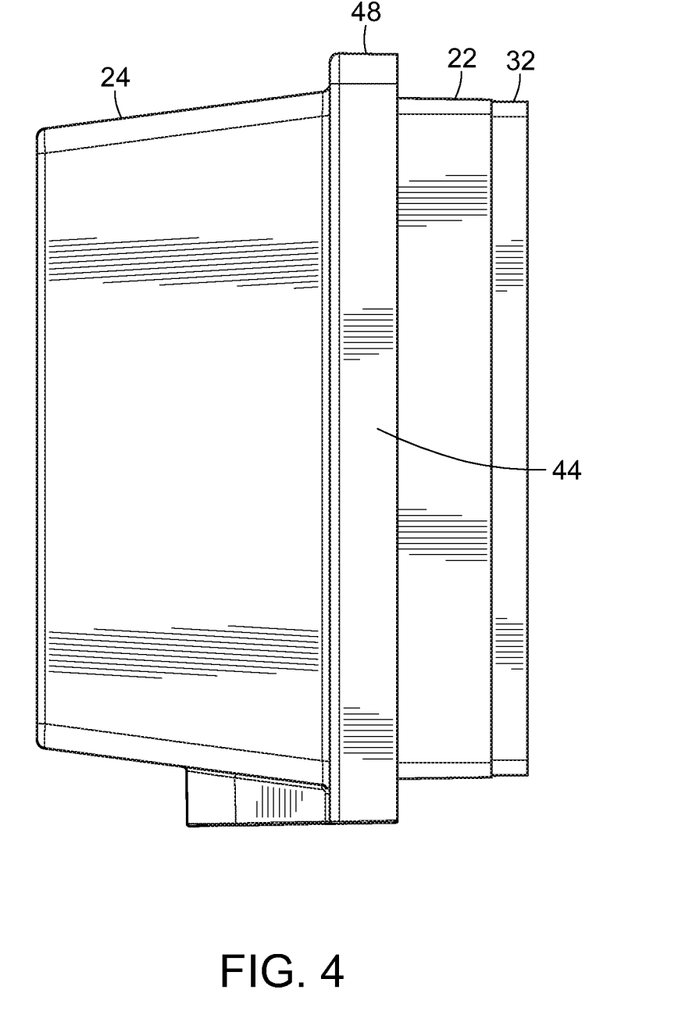
FIG. 4 is a side view of an inventive in-use cover according to the present invention.
Figure 5:
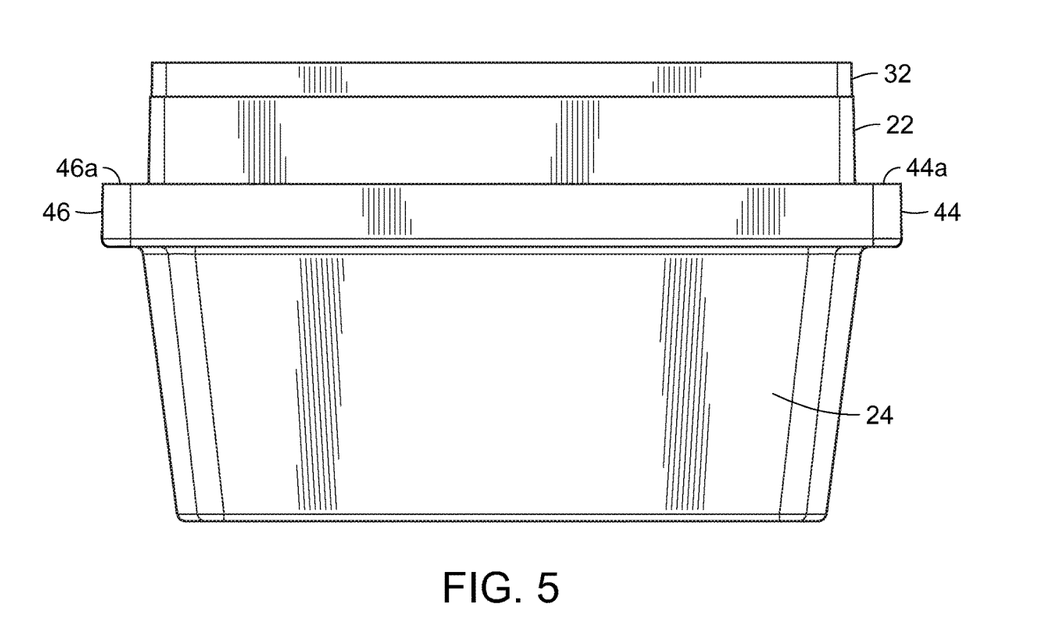
FIG. 5 is a top view of an inventive in-use cover according to the present invention.
Figure 6:
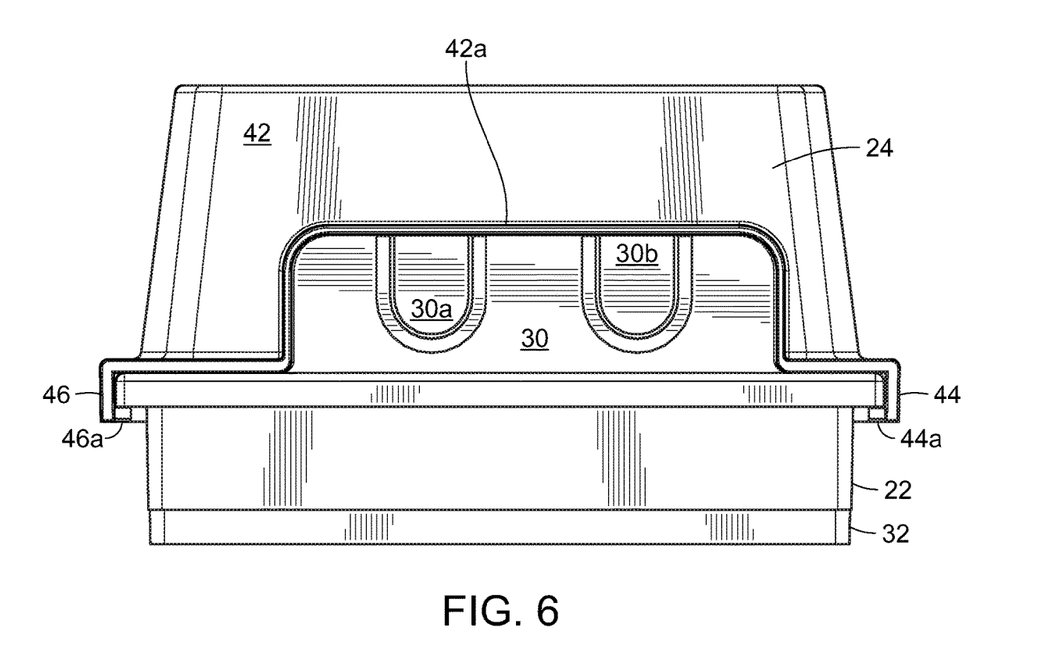
FIG. 6 is a bottom view of an inventive in-use cover according to the present invention.

The first component port 26 is preferably disposed in the middle of the front surface 22a of the base plate 22 and has an opening 26a that is sized to accept standard size electrical components, e.g., outlets, switches, etc. The first component port 26 also includes multiple screw ports 26b for securing the electrical component in place. A border frame 26c may be removed from the first component port 26 to provide a larger opening for bigger electrical components, e.g., photosensors, timers, dimmers, etc. By placing the first component port 26 in the middle of the front surface, it opens up the entire width of the base plate 22 to accept larger electrical components while maintaining a seal on the junction box.

The selectively removable knockout 28a on the second port 28 is provided to allow the inclusion of two electrical components, e.g., outlets, in the in-use cover 20 while still providing extra lateral space to the opposite side of the first port 26 for larger plugs or transformers. The base plate 22 also includes a lower ledge 30 having knockouts 30a, 30b. The lower ledge 30 provides a depth to the lower edge of the base plate 22 and the knockouts 30a, 30b allow for cords or other electrical components to pass outside the in-use cover 20 while still maintaining a seal, as described below.

Figure 7:
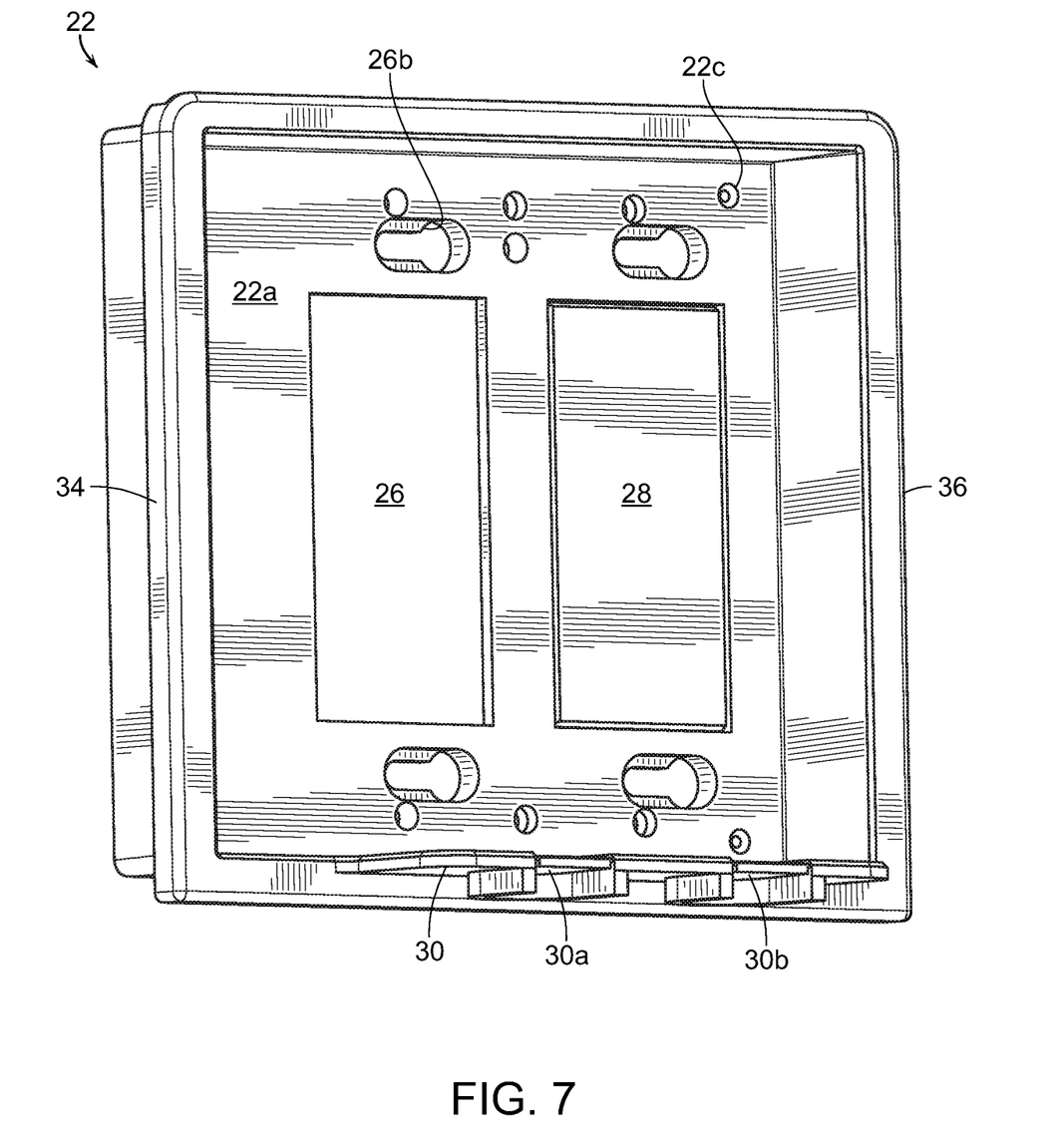
FIG. 7 is a front perspective view of a base plate for an inventive in-use cover according to the present invention.

FIG. 7 shows an alternate embodiment, wherein the base plate 22' has two permanent ports 26', 28' sized for accommodating two standard size electrical components. Other than the configuration of the ports 26', 28', this embodiment of the base plate 22' functions in the in-use cover 20 in a manner similar to the other embodiments described herein.

Figure 12:
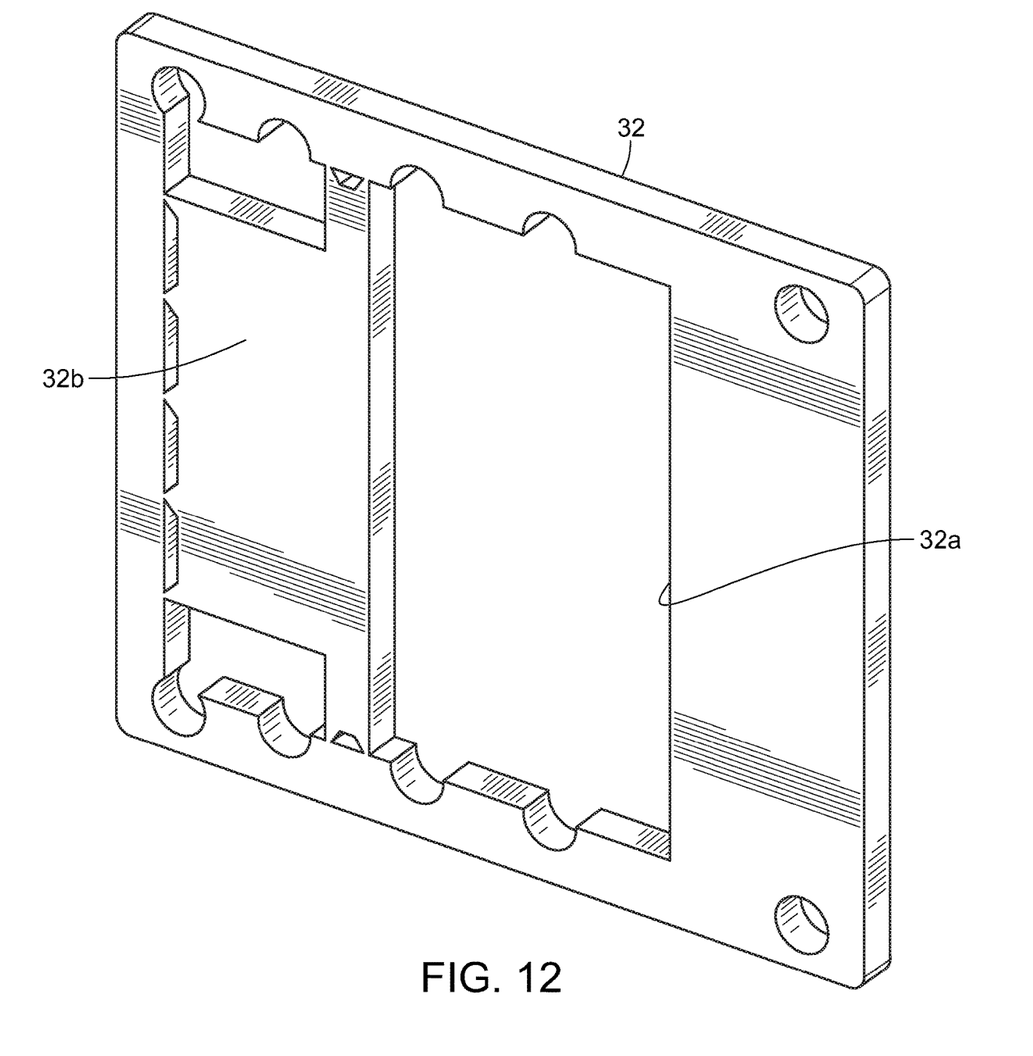
FIG. 12 is a perspective view of a gasket for an inventive in-use cover according to the present invention.
Figure 13:
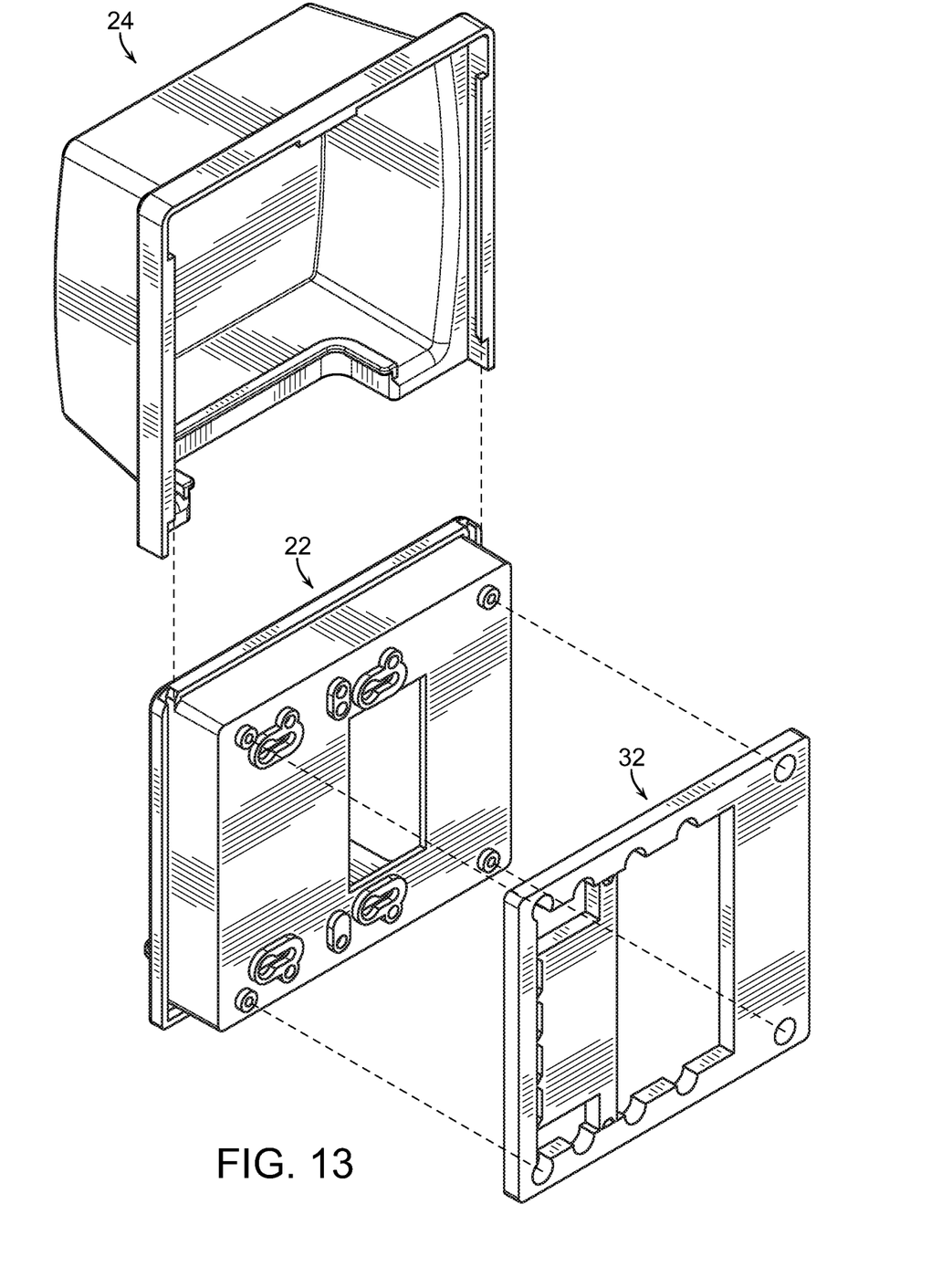
FIG. 13 is an exploded rear perspective view of an inventive in-use cover and base plate according to the present invention.

A gasket 32 (FIG. 12) is provided for disposal between the base plate 22 and the junction box. The gasket 32 seals against the intrusion of water between the base plate 22 and junction box. The gasket 32 includes an opening 32a corresponding to the first port 26 and a removable knockout 32b corresponding to the second port 28. FIG. 13 illustrates the manner in which the gasket 32, base plate, 22 and cap cover 24 are assembled.

Figure 8:
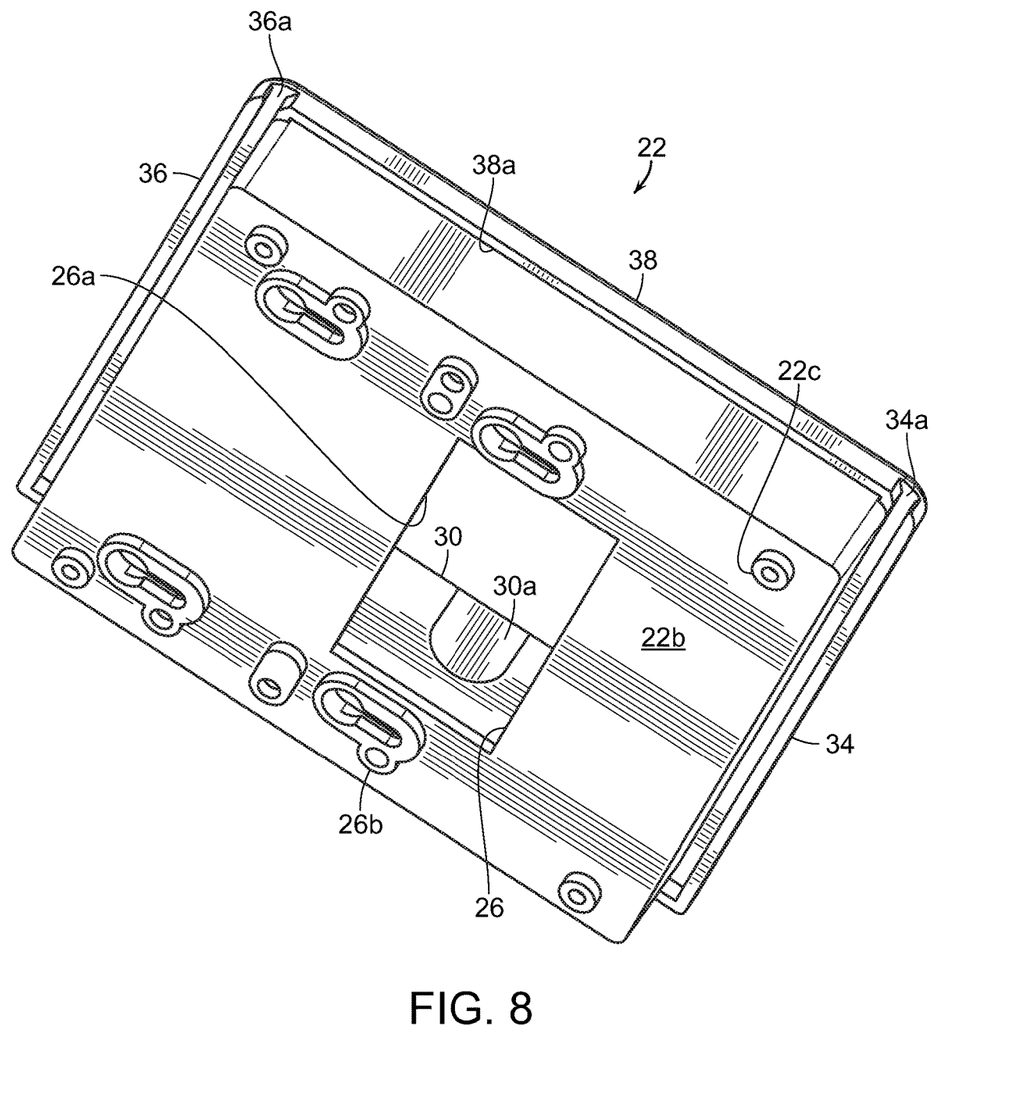
FIG. 8 is a rear perspective view of a base plate for an inventive in-use cover according to the present invention from the opposite angle of FIG. 7.
Figure 9:
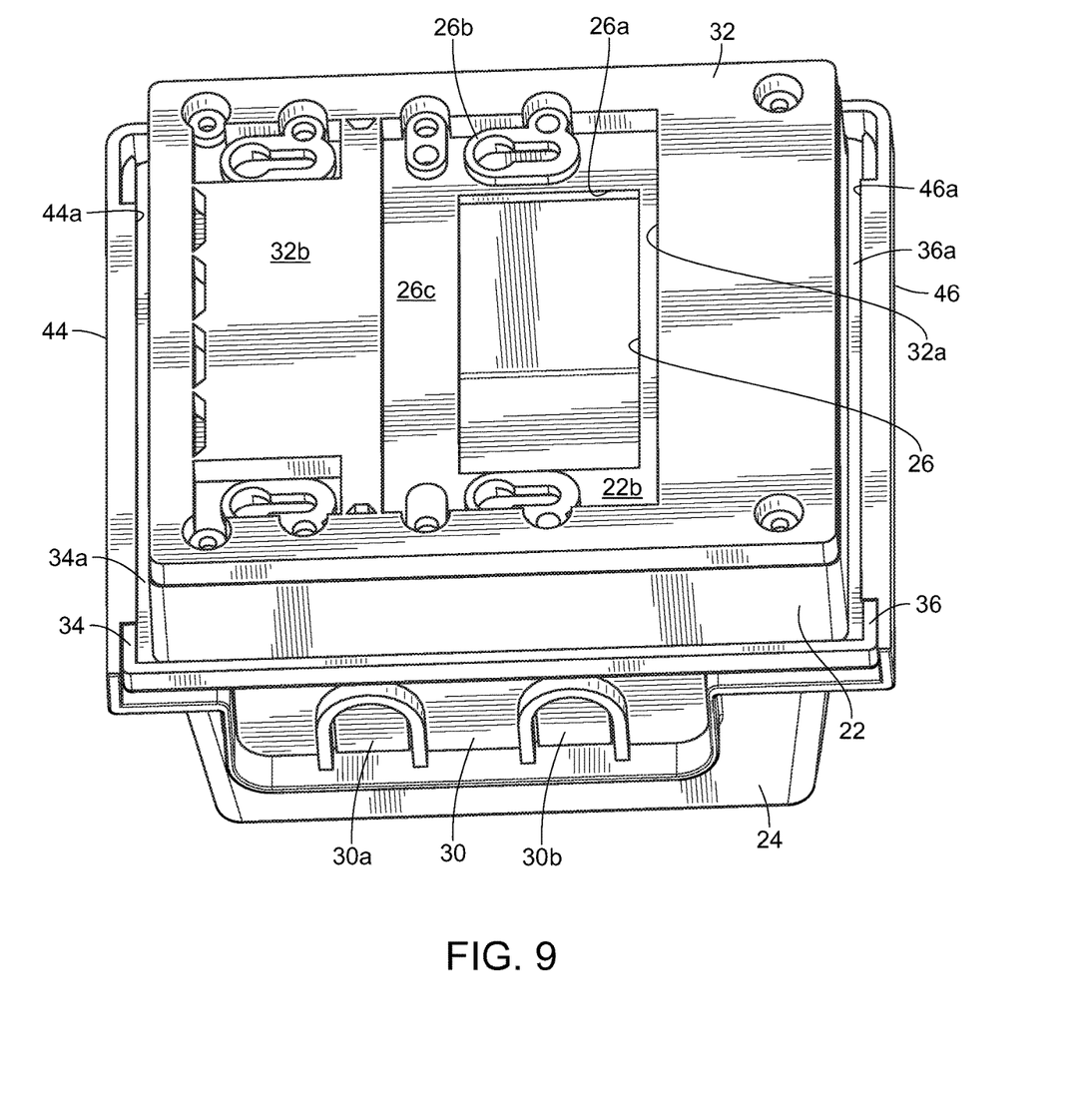
FIG. 9 is a bottom perspective view of an inventive in-use cover according to the present invention.

The side edges 34, 36 of the base plate 22 include longitudinal grooves 34a, 36a that run from top to bottom facing the rear surface 22b. The grooves 34a, 36a are configured to receive corresponding ledges on the side edges of the cover cap 24 as described below. The top edge 38 of the base plate also includes a raised edge 38a that is configured to receive a corresponding ledge on the top edge of the cover cap 24 as described below.

Figure 10:
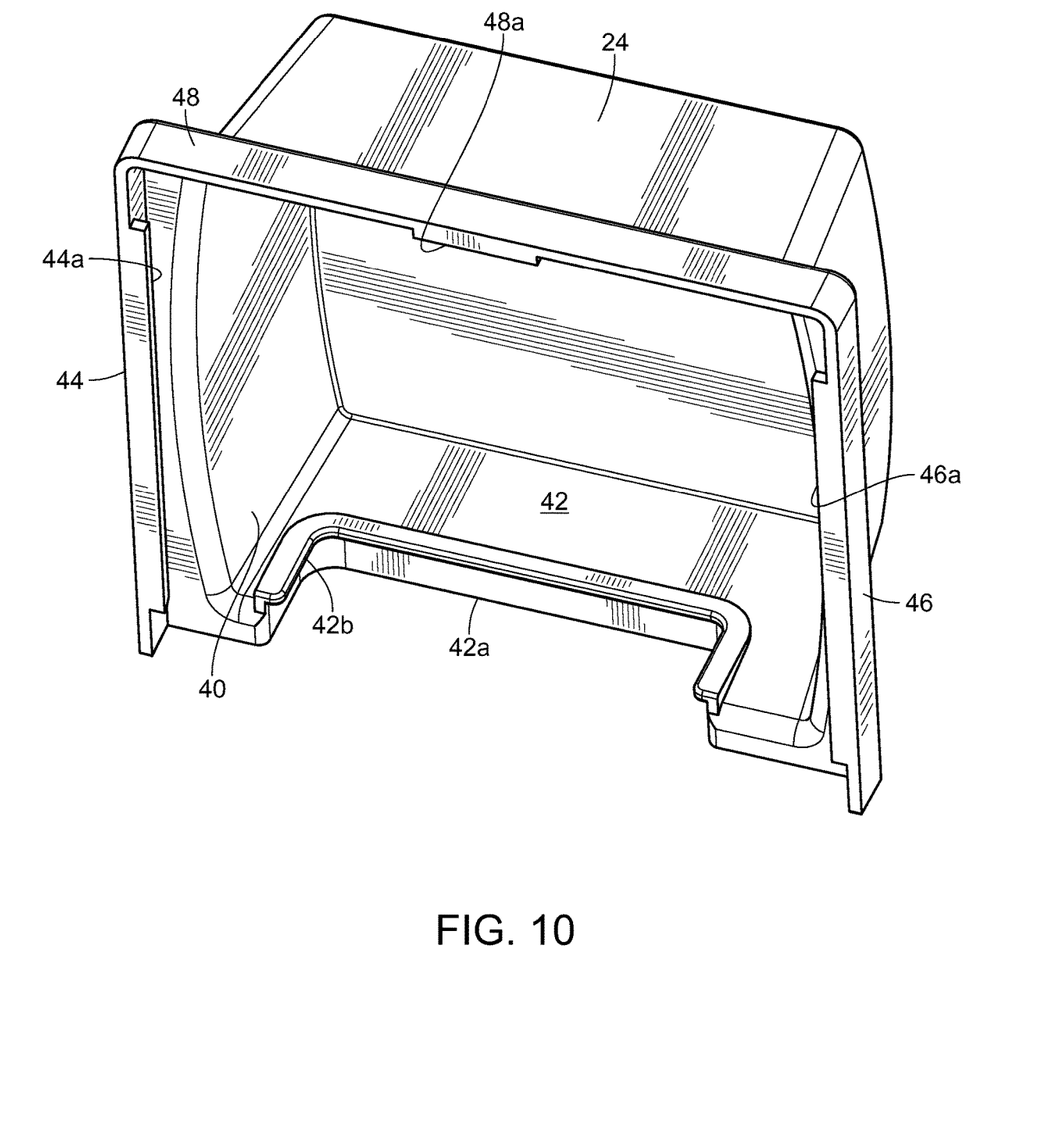
FIG. 10 is a top perspective view of a cover for an inventive in-use cover according to the present invention.
Figure 11:
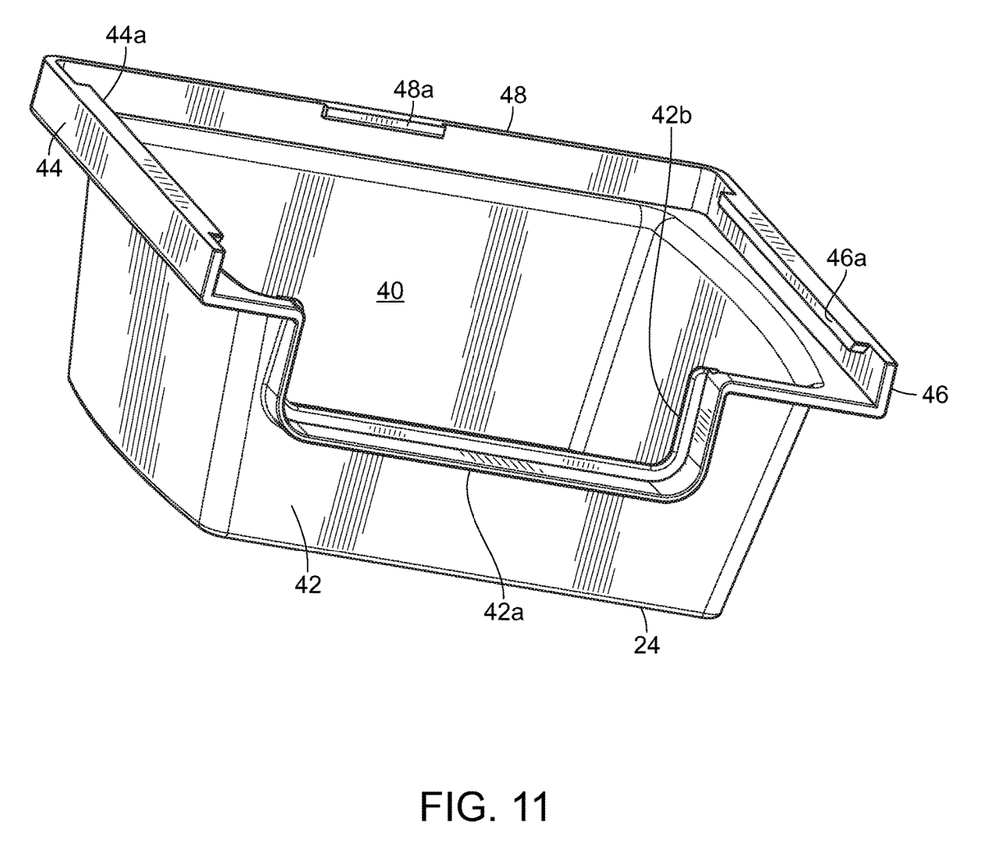
FIG. 11 is a bottom perspective view of an inventive in-use cover according to the present invention.

As shown in FIGS. 10 and 11, the cover cap 24 is an enlarged square or rectangular-shaped box that is configured to fit over the front surface 22a of the base plate 22. The interior 40 of the cap cover 24 is hollow to allow for space to accommodate plugs and cords for electrical components between the base plate 22 and cap cover 24. The bottom edge 42 of the cap cover includes a cut-out 42a that corresponds to the size and shape of the lower edge 30 of the base plate 22. An upper ledge 42b surrounds the cut-out 42a to provide additional sealing against water or moisture that may splash against the in-use cover 20.

The side edges 44, 46 of the cover cap 24 include ledges 44a, 46a configured to fit into the grooves 34a, 36a on the base plate 22 as described above. The cover cap 24 is configured to attach to and enclose the base plate 22 when these ledges 44a, 46a slide into the longitudinal grooves 34a, 36a from top to bottom. Because the side edges 44, 46 and ledges 44a, 46a surround and wrap around the side edges 35, 36, the configuration seals the sides of the in-use cover 20 against water intrusion. When the ledges 44a, 46a are fully inserted into the grooves 34a, 36a, the cut-out 42a and upper ledge 42b engage with the lower ledge 30 to seal the bottom of the in-use cover 20 against water intrusion.

The top edge 48 of the cover cap 24 also has a ledge 48a that is configured to engage the raised edge 38a of the top edge 48 on the base plate 22. This ledge 48a is designed to ensure that the top edge 48 of the cover cap 24 remains behind the base plate 22 so as to seal the top of the in-use cover 20 against water intrusion.

The cover cap 24 can be removed from the base plate 22 and replaced as often as necessary to install, adjust, or replace electrical components, plug, and other devices in the exterior junction boxes. The fact that the cover cap 24 is completely removable make such activities easier to manage with less concern for interference from surrounding structure or a spring-biased hinge or pivot forcing a cover back into place. In addition, the manner in which the cover cap 24 is attached to the base plate 22 ensures a more complete enclosure of the electrical components when plugs, cords and other devices are installed. This inventive in-use cover 20 permits the cover cap 24 to be completely closed when devices are connected to the junction box.

Although several embodiments have been described in detail for purposes of illustration, various modifications may be made without departing from the scope and spirit of the invention.

What is claimed is:

1. An in-use cover for an electrical junction box, comprising:
   a base plate configured for attachment to an electrical junction box, wherein the base plate has a back wall with a component port and is recessed relative to surrounding perimeter walls, including a lower ledge that extends distal from the back wall; and
   a cover cap configured for selective attachment to the base plate by removable engagement with the perimeter walls of the base plate, wherein the cover cap has a hollow interior disposed in proximity to the component port when the cover cap is attached to the base plate and a bottom cut-out configured for matching engagement with the lower ledge when the cover cap is fully engaged with the perimeter walls of the base plate.

2. The in-use cover of claim 1, wherein the perimeter walls of the base plate comprise a top wall, a bottom wall, and two side walls each having a side edge distal from the back wall, the bottom wall comprising the lower ledge.

3. The in-use cover of claim 2, wherein the side edge on each side wall of the base plate has a receiving channel and the cover cap has a pair of side ledges configured for sliding engagement with the receiving channel on each side edge.

4. The in-use cover of claim 3, wherein the top wall of the base plate comprises a raised edge and the cover cap has a top ledge configured for engaging the raised edge when the cover cap is fully engaged with the perimeter walls of the base plate.

5. The in-use cover of claim 1, wherein the lower ledge has a wire knock-out corresponding to the component port.

6. The in-use cover of claim 1, wherein the bottom cut-out of the cover cap has an interior ledge surrounding the bottom cut-out, the interior ledge configured to rest against a perimeter of the lower ledge.

7. The in-use cover of claim 1, wherein the base plate has at least two component ports in the back wall.

8. The in-use cover of claim 1, further comprising a gasket configured for disposal behind the base plate when it is attached to an electrical junction box.

9. An in-use cover for an electrical junction box, comprising:
a base plate configured for attachment to an electrical junction box, wherein the base plate has a back wall with a component port and is recessed relative to surrounding perimeter walls, the perimeter walls comprising a top wall, a bottom wall having a lower ledge extending distal from the back wall, and two side walls each having a side edge distal from the back wall; and
a cover cap configured for selective attachment to the base plate by removable engagement with the perimeter walls of the base plate, wherein the cover cap has a hollow interior disposed in proximity to the component port when the cover cap is attached to the base plate and a bottom cut-out configured for matching engagement with the lower ledge when the cover cap is fully engaged with the perimeter walls of the base plate.

10. The in-use cover of claim 9, wherein the side edge on each side wall of the base plate has a receiving channel and the cover cap has a pair of side ledges configured for sliding engagement with the receiving channel on each side edge.

11. The in-use cover of claim 10, wherein the top wall of the base plate comprises a raised edge and the cover cap has a top ledge configured for engaging the raised edge when the cover cap is fully engaged with the perimeter walls of the base plate.

12. The in-use cover of claim 9, wherein the lower ledge has a wire knock-out corresponding to the component port.

13. The in-use cover of claim 9, wherein the bottom cut-out of the cover cap has an interior ledge surrounding the bottom cut-out, the interior ledge configured to rest against a perimeter of the lower ledge.

14. The in-use cover of claim 9, wherein the base plate has at least two component ports in the back wall.

15. The in-use cover of claim 9, further comprising a gasket configured for disposal behind the base plate when it is attached to an electrical junction box.

16. An in-use cover for an electrical junction box, comprising:
a base plate configured for attachment to an electrical junction box, wherein the base plate has a back wall with at least two component ports and is recessed relative to surrounding perimeter walls, the perimeter walls comprising a top wall, a bottom wall having a lower ledge extending distal from the back wall, and two side walls each having a side edge distal from the back wall; and
a cover cap configured for selective attachment to the base plate by removable engagement with the perimeter walls of the base plate, wherein the cover cap has a hollow interior disposed in proximity to the at least two component ports when the cover cap is attached to the base plate and a bottom cut-out configured for matching engagement with the lower ledge when the cover cap is fully engaged with the perimeter walls of the base plate.

17. The in-use cover of claim 16, wherein the side edge on each side wall of the base plate has a receiving channel and the cover cap has a pair of side ledges configured for sliding engagement with the receiving channel on each side edge; and wherein the top wall of the base plate comprises a raised edge and the cover cap has a top ledge configured for engaging the raised edge when the cover cap is fully engaged with the perimeter walls of the base plate.

18. The in-use cover of claim 16, wherein the lower ledge has at least two wire knock-outs corresponding to the at least two component ports.

19. The in-use cover of claim 16, wherein the bottom cut-out of the cover cap has an interior ledge surrounding the bottom cut-out, the interior ledge configured to rest against a perimeter of the lower ledge.

* * * * *